US012280754B2

(12) United States Patent
Horii et al.

(10) Patent No.: US 12,280,754 B2
(45) Date of Patent: Apr. 22, 2025

(54) AIR EXHAUSTING METHOD OF VEHICLE BRAKE SYSTEM

(71) Applicant: Honda Motor Co., Ltd., Tokyo (JP)

(72) Inventors: Eisuke Horii, Tokyo (JP); Hiroyuki Iwasaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/731,388

(22) Filed: Jun. 3, 2024

(65) Prior Publication Data
US 2025/0083655 A1    Mar. 13, 2025

(30) Foreign Application Priority Data

Sep. 11, 2023   (CN) .......................... 202311161889.7

(51) Int. Cl.
*B60T 17/22* (2006.01)
*B60T 13/66* (2006.01)
*F15B 1/26* (2006.01)
*F15B 13/04* (2006.01)

(52) U.S. Cl.
CPC .......... *B60T 17/222* (2013.01); *B60T 13/662* (2013.01); *F15B 1/26* (2013.01); *F15B 13/0401* (2013.01)

(58) Field of Classification Search
CPC ...... F15B 13/0401; F15B 1/26; B60T 13/662; B60T 17/222
See application file for complete search history.

(56) References Cited

U.S. PATENT DOCUMENTS

| | | | | |
|---|---|---|---|---|
| 4,433,872 | A * | 2/1984 | Parker .................. | B60T 8/1843 303/22.5 |
| 10,046,749 | B2 * | 8/2018 | Irwan .................... | B60T 13/745 |
| 2019/0152458 | A1 * | 5/2019 | Akahane ............... | B60T 8/4077 |

FOREIGN PATENT DOCUMENTS

| | | |
|---|---|---|
| JP | 2016078753 | 5/2016 |
| JP | 2016147644 | 8/2016 |

* cited by examiner

*Primary Examiner* — Abiy Teka
(74) *Attorney, Agent, or Firm* — JCIPRNET

(57) ABSTRACT

An air exhausting method of a vehicle brake system is provided. The air exhausting method of the vehicle brake system includes: a first step of actuating a slave cylinder on a pressurization side in a state where a switching valve communicates the slave cylinder with a brake fluid pressure control device, so that air retained in a passage section from the slave cylinder to the brake fluid pressure control device is exhausted from an air exhausting hole; a second step of actuating the slave cylinder on a depressurization side after the first step in a state where the air exhausting hole is closed, so that air retained in a bypass passage moves toward the passage section; and performing the first step again after the second step, so that air moved from the bypass passage to the passage section is exhausted from the air exhausting hole.

1 Claim, 2 Drawing Sheets

AIR EXHAUSTING METHOD OF VEHICLE BRAKE SYSTEM

CROSS-REFERENCE TO RELATED APPLICATION

This application claims the priority benefit of China application serial no. 202311161889.7, filed on Sep. 11, 2023. The entirety of the above-mentioned patent application is hereby incorporated by reference herein and made a part of this specification.

BACKGROUND

Technical Field

The disclosure relates to an air exhausting method of a vehicle brake system.

Description of Related Art

In the prior art, a vehicle brake system includes a master cylinder that generates brake fluid pressure through operating a brake operator (for example, a brake pedal) and a slave cylinder that generates brake fluid pressure by using a driving force of an actuator (for example, a motor) based on an electrical signal, so that the brake fluid pressure generated by the master cylinder or the slave cylinder by pressurizing a brake fluid is supplied to a wheel cylinder, thereby applying necessary braking force to a wheel. A vehicle behavior stabilizer for controlling the brake fluid pressure transmitted to the wheel cylinder is disposed as a brake fluid pressure control device in a passage on a downstream side of the slave cylinder. Furthermore, the vehicle brake system may be provided with a switching valve (for example, Japanese Patent Publication No. 2016-147644) to switch a connection state of the master cylinder and the slave cylinder (whether to supply the brake fluid to the brake fluid pressure control device), thereby shortening the passage and miniaturizing the vehicle brake system.

Normally, when the vehicle brake system performs a braking action that is not dependent on an operation by a driver, the switching valve switches to communicate the slave cylinder with the brake fluid pressure control device, but when an abnormality occurs in the slave cylinder, the switching valve switches to communicate the master cylinder with the brake fluid pressure control device. At this time, since the orifice (cross-sectional area) of the passage connecting the switching valve and the master cylinder is smaller than the orifice (cross-sectional area) of the passage connecting the switching valve and the slave cylinder, the fluidity of the brake fluid deteriorates at low temperatures. In response to this, a method in which a bypass passage and a check valve are disposed in the vehicle brake system to communicate the passage from a reservoir of the master cylinder or the slave cylinder toward a downstream side of the switching valve (for example, Japanese Patent Publication No. 2016-078753) is developed, so as to ensure the flow of the brake fluid required for the pressurization control by the brake fluid pressure control device. However, when such a structure is adopted, air tends to remain in the passage on a downstream side of the check valve. When the air is trapped on the downstream side of the check valve, the air cannot be manually exhausted via a pedal device, etc., and a dedicated air exhausting device must be used to exhaust the air, thereby increasing additional costs and operation procedures.

SUMMARY

The disclosure provides an air exhausting method of a vehicle brake system, used to exhaust air from the vehicle brake system. The vehicle brake system includes a master cylinder, a slave cylinder, a passage, a wheel cylinder, a switching valve, a brake fluid pressure control device, a bypass passage, and a check valve, the master cylinder generates brake fluid pressure through operating a brake operator, the slave cylinder generates brake fluid pressure by using a driving force of an actuator based on an electrical signal, the passage connects the master cylinder and the slave cylinder to the wheel cylinder, the switching valve switches a communication state of the master cylinder and the slave cylinder, the brake fluid pressure control device is disposed in the passage closer to a downstream side than the switching valve and controls the brake fluid pressure transmitted to the wheel cylinder, the bypass passage is connected from a reservoir installed on the master cylinder or the slave cylinder to a part of the passage closer to the downstream side than the switching valve and closer to an upstream side than the brake fluid pressure control device, the check valve is disposed in the bypass passage, when the brake fluid pressure control device performs pressurization control on a brake fluid, the check valve allows the brake fluid to flow from a side close to the reservoir toward a side close to the brake fluid pressure control device and blocks the brake fluid from flowing from the side close to the brake fluid pressure control device toward the side close to the reservoir, and the wheel cylinder has a switchable air exhausting hole. The air exhausting method of the vehicle brake system includes: a first step of actuating the slave cylinder on a pressurization side in a state where the switching valve communicates the slave cylinder with the brake fluid pressure control device, so that air retained in a passage section from the slave cylinder to the brake fluid pressure control device is exhausted from the air exhausting hole; a second step of actuating the slave cylinder on a depressurization side after the first step in a state where the air exhausting hole is closed, so that air retained in the bypass passage moves toward the passage section; and performing the first step again after the second step, so that air moved from the bypass passage to the passage section is exhausted from the air exhausting hole.

DESCRIPTION OF THE EMBODIMENTS

Figure 1:
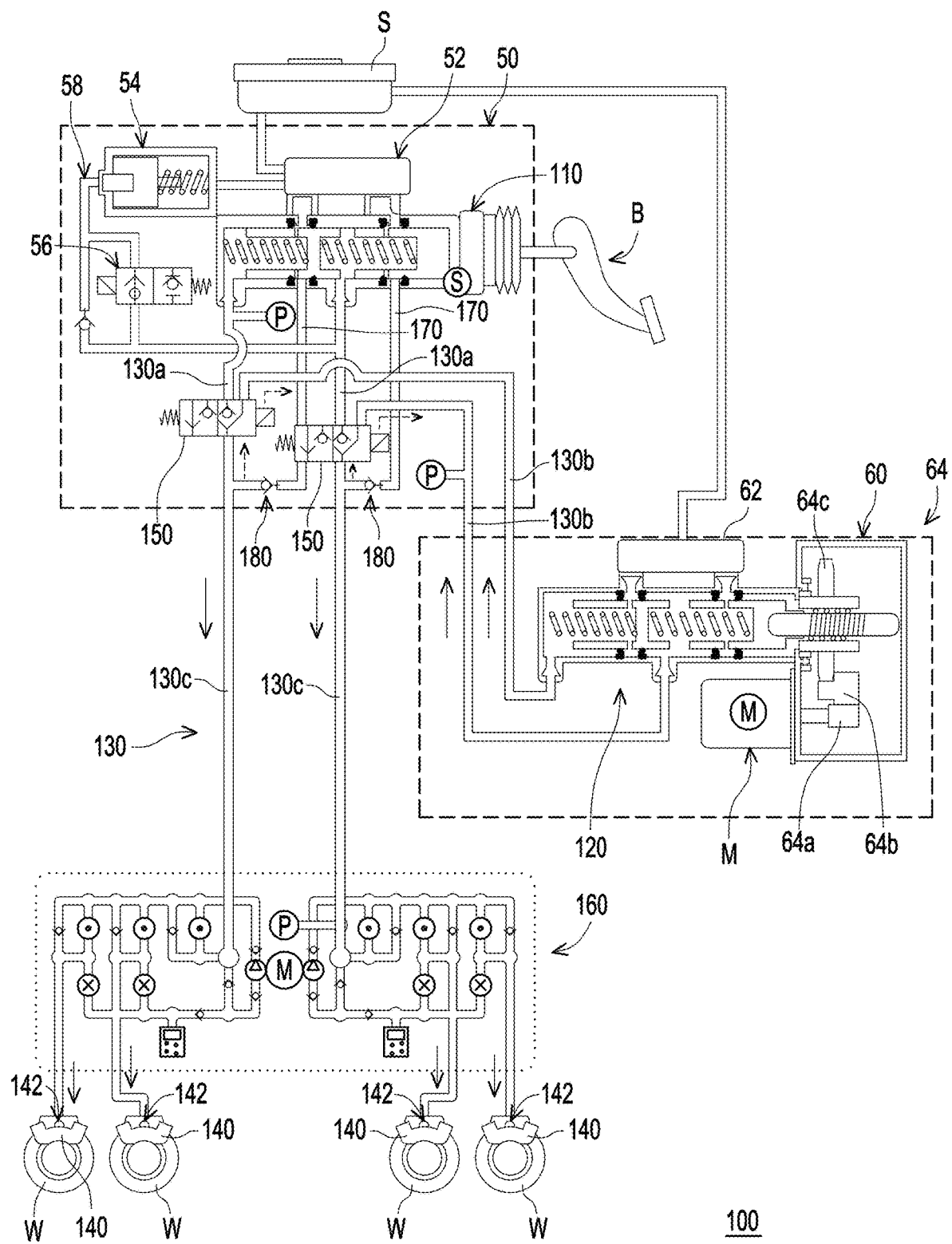
FIG. 1 is a schematic diagram of a structural composition of a vehicle brake system according to an embodiment of the disclosure.

The disclosure provides an air exhausting method of a vehicle brake system, which can exhaust air more efficiently in the vehicle brake system that uses a switching valve to shorten a passage and miniaturize the system, and uses a bypass passage and a check valve to ensure a flow of a brake fluid.

The disclosure provides an air exhausting method of a vehicle brake system, used to exhaust air from the vehicle brake system. The vehicle brake system includes a master cylinder, a slave cylinder, a passage, a wheel cylinder, a switching valve, a brake fluid pressure control device, a bypass passage, and a check valve, the master cylinder generates brake fluid pressure through operating a brake operator, the slave cylinder generates brake fluid pressure by using a driving force of an actuator based on an electrical signal, the passage connects the master cylinder and the slave cylinder to the wheel cylinder, the switching valve switches a communication state of the master cylinder and the slave cylinder, the brake fluid pressure control device is disposed in the passage closer to a downstream side than the switching valve and controls the brake fluid pressure transmitted to the wheel cylinder, the bypass passage is connected from a reservoir installed on the master cylinder or the slave cylinder to a part of the passage closer to the downstream side than the switching valve and closer to an upstream side than the brake fluid pressure control device, the check valve is disposed in the bypass passage, when the brake fluid pressure control device performs pressurization control on a brake fluid, the check valve allows the brake fluid to flow from a side close to the reservoir toward a side close to the brake fluid pressure control device and blocks the brake fluid from flowing from the side close to the brake fluid pressure control device toward the side close to the reservoir, and the wheel cylinder has a switchable air exhausting hole. The air exhausting method of the vehicle brake system includes: a first step of actuating the slave cylinder on a pressurization side in a state where the switching valve communicates the slave cylinder with the brake fluid pressure control device, so that air retained in a passage section from the slave cylinder to the brake fluid pressure control device is exhausted from the air exhausting hole; a second step of actuating the slave cylinder on a depressurization side after the first step in a state where the air exhausting hole is closed, so that air retained in the bypass passage moves toward the passage section; and performing the first step again after the second step, so that air moved from the bypass passage to the passage section is exhausted from the air exhausting hole.

Based on the above, in the air exhausting method of the vehicle brake system of the disclosure, for the vehicle brake system that uses the switching valve to switch the communication state of the master cylinder and the slave cylinder connected to the wheel cylinder as a fluid pressure supply source and uses the bypass passage and the check valve connected from the reservoir installed on the master cylinder or the slave cylinder to the part of the passage closer to the downstream side than the switching valve and closer to the upstream side than the brake fluid pressure control device, the slave cylinder is actuated on the pressurization side and the depressurization side in sequence, and the air exhausting hole of the wheel cylinder is opened and closed, so that air retained in the bypass passage moves from the bypass passage to the passage section and is exhausted from the air exhausting hole. Thus, in the disclosure, an external air exhausting device does not need to be used, and air can be exhausted via a simple operation such as an operation of the slave cylinder and/or an opening/closing operation of the air exhausting hole, thereby saving additional costs and operation procedures. Accordingly, the air exhausting method of the vehicle brake system of the disclosure can exhaust air more efficiently in the vehicle brake system which uses the switching valve to shorten the passage and miniaturize the system, and uses the bypass passage and the check valve to ensure the flow of the brake fluid.

Figure 2:
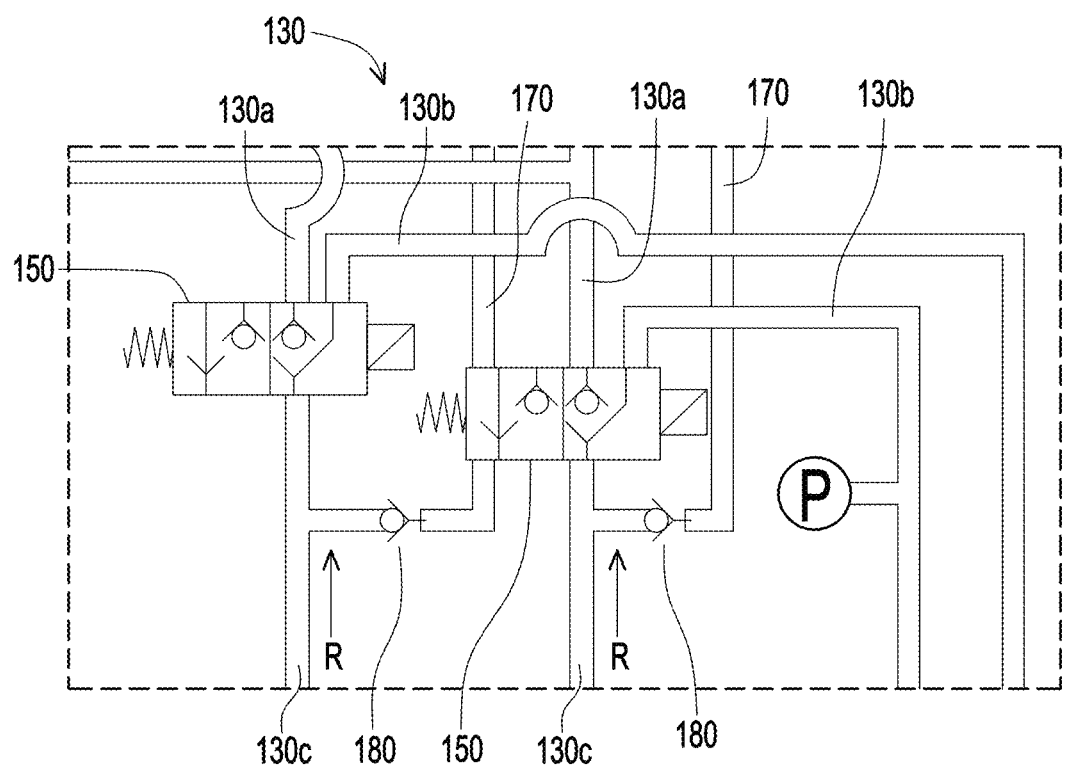
FIG. 2 is a partially enlarged schematic diagram of the vehicle brake system shown in FIG. 1.
Figure 3:
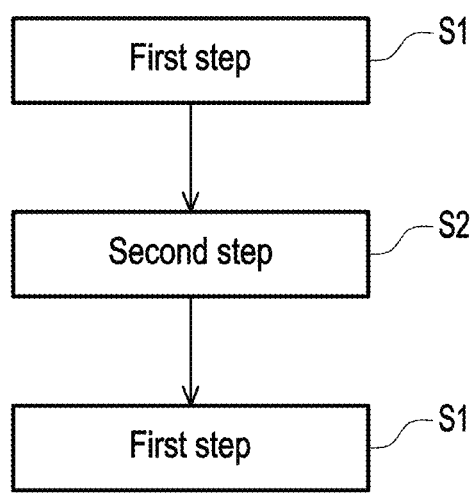
FIG. 3 is a flowchart of an air exhausting method of the vehicle brake system shown in FIG. 1.

Reference will now be made in detail to exemplary embodiments of the disclosure, examples of the exemplary embodiments are illustrated in the drawings. FIG. 1 is a schematic diagram of a structural composition of a vehicle brake system according to an embodiment of the disclosure, FIG. 2 is a partially enlarged schematic diagram of the vehicle brake system shown in FIG. 1, and FIG. 3 is a flowchart of an air exhausting method of the vehicle brake system shown in FIG. 1. The specific structure of a vehicle brake system 100 and the operation flow of the air exhausting method of the vehicle brake system 100 of the embodiments will be described below with reference to FIG. 1 to FIG. 3. However, the same is only an example of the disclosure, and the disclosure is not limited thereto and may be adjusted according to needs.

Please refer to FIG. 1. In the embodiment, there are two types of brake systems for the vehicle brake system 100, a brake system by wire that transmits an electrical signal to operate a brake and a fluid pressure brake system that transmits fluid pressure to operate a brake. The vehicle brake system 100 includes a master cylinder 110, a slave cylinder 120, a passage 130, a wheel cylinder 140, a switching valve 150, a brake fluid pressure control device 160, a bypass passage 170, and a check valve 180. The implementation of each component will be described in sequence below.

In the embodiment, the master cylinder 110 generates brake fluid pressure through operating a brake operator (for example, a brake pedal B). The slave cylinder 120 generates brake fluid pressure using a driving force of an actuator (for example, a motor M) based on an electrical signal. The master cylinder 110 is, for example, configured as a part of the pedal device 50 (that is, a brake input device). The pedal device 50 further includes the brake pedal B as the brake operator, a reservoir 52 for storing the brake fluid, a pedal force simulator 54, a safety valve 56, etc., and the components are connected to each other via a piping 58 in the pedal device 50. Correspondingly, the slave cylinder 120 is, for example, configured as a part of a booster device 60 (that is, an electric cylinder device). The booster device 60 further includes the motor M as the actuator, a reservoir 62 for storing the brake fluid, a gear set 64 including an input gear 64a, an idle gear 64b, and an output gear 64c, etc., and the components are connected to each other. The pedal device 50 including the master cylinder 110 and the booster device 60 including the slave cylinder 120 may be installed in an engine room of a vehicle, and the pedal device 50 and the booster device 60 may be electrically connected via an unshown wiring harness, etc. Furthermore, the fluid reservoir 52 connected to the master cylinder 110 and the fluid reservoir 62 connected to the slave cylinder 120 may supply the brake fluid from the same fluid supply source S. However, the disclosure is not limited thereto and may be adjusted according to requirements.

Furthermore, in the embodiment, as shown in FIG. 1, the passage 130 connects the master cylinder 110 and the slave cylinder 120 to the wheel cylinder 140 to supply the brake fluid pressure generated by the master cylinder 110 or the slave cylinder 120 via pressurizing the brake fluid to the wheel cylinder 140, thereby applying a necessary braking force to a wheel W. The switching valve 150 is disposed in the passage 130 at a position closer to a downstream side than the master cylinder 110 and the slave cylinder 120, and connects the master cylinder 110, the slave cylinder 120, and the wheel cylinder 140 through the passage 130. The switching valve 150 switches a communication state of the master cylinder 110 and the slave cylinder 120. The passage 130 includes a passage section 130a from the master cylinder 110 to the switching valve 150, a passage section 130b from the slave cylinder 120 to the switching valve 150, and a passage section 130c from the switching valve 150 to the wheel cylinder 140. Therefore, the switching valve 150 is, for example, a three-way valve connecting the master cylinder 110, the slave cylinder 120, and the wheel cylinder 140, but not limited thereto. In addition, the wheel cylinders 140 are respectively connected to the wheels W of a vehicle (not shown). That is, the wheel cylinders 140 may be disposed one by one corresponding to the number of the wheels W (for example, four wheels W and four wheel cylinders 140 are provided). Thus, the braking force may be applied to each wheel W via the brake fluid pressure generated by at least one of the master cylinder 110 and the slave cylinder 120, thereby performing brake control on the vehicle.

Furthermore, the master cylinder 110 and the slave cylinder 120 are, for example, tandem cylinders each having two cylinder barrels. Therefore, the two cylinder barrels of the master cylinder 110 and the slave cylinder 120 may be connected to the wheel cylinders 140 via two passages 130. The first passage 130 is connected from one of the cylinder barrels of the master cylinder 110 and one of the cylinder barrels of the slave cylinder 120 through the first switching valve 150 toward the downstream side to a part of the wheel cylinders 140 (for example, two of the wheel cylinders 140). Correspondingly, the second passage 130 is connected from the other cylinder barrel of the master cylinder 110 and the other cylinder barrel of the slave cylinder 120 through the second switching valve 150 toward the downstream side to another part of the wheel cylinders 140 (for example, the other two wheel cylinders 140). The passage 130 is a general term for piping extending between the master cylinder 110, the slave cylinder 120, and the wheel cylinder 140 to communicate the cylinders (that is, including the passage sections 130$a$, 130$b$, and 130$c$). In a case where the vehicle brake system 100 uses the master cylinder 110 and the slave cylinder 120 each having two cylinder barrels and is provided with two passages 130, two switching valves 150 are also provided. The two passages 130 and the two switching valves 150 may be separately controlled or may also be simultaneously controlled, or one may serve as a main passage and the other one may serve as a backup passage to be controlled. However, the master cylinder 110 and the slave cylinder 120 may each have a single cylinder barrel, and the vehicle brake system 100 may also be provided with only passage 130 and one switching valve 150. The disclosure is not limited thereto and may be adjusted according to requirements.

Furthermore, in the embodiment, as shown in FIG. 1, the brake fluid pressure control device 160 is disposed in the passage 130 (that is, the passage section 130$c$) closer to the downstream side than the switching valve 150 and controls the brake fluid pressure transmitted to the wheel cylinders 140, thereby supporting stabilization of a vehicle behavior. Specifically, the brake fluid pressure control device 160 is connected to the master cylinder 110 and the slave cylinder 120 via the passage 130 (the switching valve 150 is disposed in the passage 130). For example, the passage section 130$c$ is connected from the switching valve 150 to the brake fluid pressure control device 160 disposed on an upstream side of the wheel cylinder 140. Furthermore, the brake fluid pressure control device 160 is connected to the wheel cylinder 140 via an internal piping thereof, and the internal piping may be provided with a control valve for controlling whether the piping is communicated with the wheel cylinder 140, etc., but the disclosure is not limited thereto. The wheel cylinder 140 is, for example, configured as a part of a disc brake mechanism (not shown). The brake fluid pressure from the master cylinder 110 or the slave cylinder 120 and controlled (pressurized or depressurized) by the brake fluid pressure control device 160 may be transmitted to the wheel cylinder 140, so as to drive the disc brake mechanism to provide a braking force to each wheel W. The two passages 130 connecting the master cylinder 110 and the slave cylinder 120 are respectively connected to different sets of the wheel cylinders 140 through the switching valve 150 and the brake fluid pressure control device 160, so that the wheel cylinders 140 may independently control the braking of the wheels W. However, the disclosure is not limited thereto and may be adjusted according to requirements.

As an example, the brake fluid pressure control device 160 is, for example, implemented by a vehicle behavior stability device such as a registered trademark vehicle stability assist (VBA) system, but the disclosure is not limited thereto. The brake fluid pressure control device 160 has, for example, an anti-lock braking system (ABS) function for preventing wheel lock during braking, a traction control system (TCS) function for preventing wheel slip during acceleration, and a function for preventing side slip during turning. The brake fluid pressure control device 160 may be installed in the engine room of the vehicle, wherein the pedal device 50, the booster device 60, and the brake fluid pressure control device 160 may be separately disposed in the engine room, or a part or all of the devices may be integrated. However, the disclosure is not limited thereto and may be adjusted according to requirements.

Furthermore, in the embodiment, as shown in FIG. 1, the bypass passage 170 is connected from a reservoir installed on the master cylinder 110 or the slave cylinder 120 (from the reservoir 52 installed on the master cylinder 110 in the embodiment) to a part of the passage 130 (that is, the passage section 130$c$ in FIG. 1) closer to the downstream side than the switching valve 150 and closer to the upstream side than the brake fluid pressure control device 160. That is, the bypass passage 170 is connected from the reservoir 52 to the passage section 130$c$ between the switching valve 150 and the brake fluid pressure control device 160, bypassing the master cylinder 110 and the switching valve 150. Furthermore, the check valve 180 is disposed in the bypass passage 170. When the brake fluid pressure control device 160 performs pressurization control on the brake fluid pressure, the check valve 180 allows the brake fluid to flow from a side close to the reservoir 52 toward a side close to the brake fluid pressure control device 160 and blocks the brake fluid from flowing from the side close to the brake fluid pressure control device 160 toward the side close to the reservoir 52. In the embodiment where two passages 130 are provided as described above, two bypass passages 170 and two check valves 180 may also be provided, but the disclosure is not limited thereto.

Via the above arrangement, when the brake fluid pressure control device 160 performs pressurization control on the brake fluid, the check valve 180 disposed in the bypass passage 170 allows the brake fluid to flow from the side close to the reservoir 52 toward the side close to the brake fluid pressure control device 160. Therefore, the brake fluid for pressurization may be directly sucked in from the reservoir 52 closer to the upstream side than the brake fluid pressure control device 160 through the bypass passage 170, so as to provide sufficient brake fluid from the reservoir 52 installed on the master cylinder 110 to the brake fluid pressure control device 160 performing pressurization control via the bypass passage 170. That is, when the brake fluid pressure control device 160 performs pressurization control, it is not necessary to provide the brake fluid through the master cylinder 110 or the slave cylinder 120, so that the resistance when the brake fluid is sucked in is smaller and the flow is greater than that of the prior art. As a result, the flow of the brake fluid required for the pressurization control by the brake fluid pressure control device 160 can be smoothly ensured. Furthermore, the check valve 180 blocks the brake fluid from flowing from the side close to the brake fluid pressure control device 160 toward the side close to the reservoir 52.

In other embodiments not shown, the bypass passage 170 may also be connected from the reservoir 62 installed on the slave cylinder 120 to a part of the passage 130 (that is, the passage section 130*c*) closer to the downstream side than the switching valve 150 and closer to the upstream side than the brake fluid pressure control device 160. That is, the bypass passage 170 is connected from the reservoir 62 to the passage section 130*c* between the switching valve 150 and the brake fluid pressure control device 160, bypassing the slave cylinder 120 and the switching valve 150. Furthermore, the bypass passage 170 may also be provided with the check valve 180 to perform similar control as described above. That is, when the brake fluid pressure control device 160 performs pressurization control on the brake fluid, the check valve 180 allows the brake fluid to flow from a side close to the reservoir 62 toward the side close to the brake fluid pressure control device 160, so that the brake fluid for pressurization may be directly sucked in from the reservoir 62 closer to the upstream side than the brake fluid pressure control device 160 through the bypass passage 170, so as to provide sufficient brake fluid from the reservoir 62 installed on the slave cylinder 120 to the brake fluid pressure control device 160 performing pressurization control via the bypass passage 170. In this way, the flow of the brake fluid required for the pressurization control of the brake fluid pressure control device 160 can also be smoothly ensured. However, the disclosure does not limit the specific connection position of the bypass passage 170, which may be adjusted according to requirements.

Please refer to FIG. 2. In the embodiment, when the vehicle brake system 100 adopts such a structure, air is easily retained in a passage on a downstream side of the check valve 180, that is, a region R (an end of the bypass passage 170) between the check valve 180 and the passage section 130*c*. In this regard, the embodiment provides an air exhausting method of the vehicle brake system 100 as shown in FIG. 3, which is to exhaust air from the vehicle brake system 100 by operating components of the vehicle brake system 100 itself without using a dedicated air exhausting device. The wheel cylinder 140 has a switchable air exhausting hole 142 (shown in FIG. 1), so that in a case where no brake control is performed, the components of the vehicle brake system 100 itself are operated to exhaust air from the air exhausting hole 142 of the wheel cylinder 140.

Specifically, in the embodiment, as shown in FIG. 1 and FIG. 3, the air exhausting method of the vehicle brake system 100 is used to exhaust air from the vehicle brake system 100. The air exhausting method of the vehicle brake system 100 includes a first step S1 and a second step S2. In the first step S1, in a state where the switching valve 150 communicates the slave cylinder 120 with the brake fluid pressure control device 160, the slave cylinder 120 is actuated on a pressurization side, and air retained in the passage sections 130*b* and 130*c* from the slave cylinder 120 to the brake fluid pressure control device 160 is exhausted from the air exhausting hole 142 (via air exhausting paths shown by solid arrows in FIG. 1). In the second step S2, after the first step S1, in a state where the air exhausting hole 142 is closed, the slave cylinder 120 is actuated on a depressurization side, so that air retained in the bypass passage 170 moves toward the passage sections 130*b* and 130*c* (via moving paths shown by dotted arrows in FIG. 1). Furthermore, after the second step S2, the first step S1 is performed again, so that air moved from the bypass passage 170 to the passage sections 130*b* and 130*c* is exhausted from the air exhausting hole 142 (via the air exhausting paths shown by the solid arrows in FIG. 1).

More specifically, in the embodiment, the first step S1 is first performed. The slave cylinder 120 actuated on the pressurization side supplies the brake fluid to the wheel cylinder 140 through the communicated switching valve 150 and brake fluid pressure control device 160. At this time, air retained in the passage sections 130*b* and 130*c* from the slave cylinder 120 to the brake fluid pressure control device 160 also moves toward the wheel cylinder 140 along with the brake fluid (via the air exhausting paths shown by the solid arrows in FIG. 1), and is exhausted from the air exhausting hole 142. Subsequently, the second step S2 is performed. The slave cylinder 120 actuated on the depressurization side reversely draws the brake fluid flowing toward the wheel cylinder 140 through the communicated switching valve 150 and brake fluid pressure control device 160, so that air retained in the bypass passage 170 moves toward the passage sections 130*b* and 130*c* (via the moving paths shown by the dotted arrows in FIG. 1). At this time, since air in the passage sections 130*b* and 130*c* is basically exhausted and the air exhausting hole 142 is closed, air can be prevented from flowing back from a side close to the air exhausting hole 142 toward the passage sections 130*b* and 130*c*. Finally, the first step S1 is performed again. Air moved from the bypass passage 170 to the passage sections 130*b* and 130*c* in the second step S2 is exhausted from the air exhausting hole 142 (via the air exhausting paths shown by the solid arrows in FIG. 1).

As can be seen from the above, in the air exhausting method of the vehicle brake system 100 of the embodiment, for the vehicle brake system 100 which uses the switching valve 150 to switch the communication state of the master cylinder 110 and the slave cylinder 120 connected to the wheel cylinder 140 as a fluid pressure supply source and uses the bypass passage 170 and the check valve 180 connected from the reservoir 52 installed on the master cylinder 110 or the reservoir 62 of the slave cylinder 120 to the part of the passage 130 (that is, the passage section 130*c*) closer to the downstream side than the switching valve 150 and closer to the upstream side than the brake fluid pressure control device 160, the slave cylinder 120 is actuated on the pressurization side and the depressurization side in sequence, and the air exhausting hole 142 of the wheel cylinder 140 is opened and closed, so that air retained in the bypass passage 170 moves from the bypass passage 170 to the passage sections 130*b* and 130*c* and is exhausted from the air exhausting hole 142. Thus, in the embodiment, an external air exhausting device does not need to be used, and air can be exhausted via a simple operation such as an operation of the slave cylinder 120 and/or an opening/closing operation of the air exhausting hole 142, thereby saving additional costs and operation procedures. Accordingly, the air exhausting method of the vehicle brake system 100 can exhaust air more efficiently in the vehicle brake system 100 which uses the switching valve 150 to shorten the passage 130 and miniaturize the system, and uses the bypass passage 170 and the check valve 180 to ensure the flow of the brake fluid.

Although the above content uses the vehicle brake system 100 as an example to illustrate the implementation of the air exhausting method of the vehicle brake system 100, the air exhausting method of the vehicle brake system is not limited to being used to exhaust air in the vehicle brake system 100 having the above structure, as long as the air exhausting method of the vehicle brake system is used for a vehicle brake system provided with components such as the master cylinder 110, the slave cylinder 120, the passage 130, the wheel cylinder 140, the switching valve 150, the brake fluid pressure control device 160, the bypass passage 170, and the check valve 180 that meet the above description. In particular, the vehicle brake system needs to be provided with components such as the slave cylinder 120, the passage 130, the wheel cylinder 140 having the air exhausting hole 142, the switching valve 150, the brake fluid pressure control device 160, the bypass passage 170, and the check valve 180 to implement the first step S1 and the second step S2 in the air exhausting method of the vehicle brake system. Furthermore, the air exhausting method of the vehicle brake system is not limited to having only the first step S1 and the second step S2, and may also have other operation steps not shown to assist in exhausting air. Only the minimum necessary steps are listed for the air exhausting method of the vehicle brake system. Furthermore, the disclosure is not limited to performing the first step S1 again only once after performing the first step S1 and the second step S2. For example, in an embodiment not shown, the first step S1 and the second step S2 may be repeatedly executed to exhaust air retained in the bypass passage 170 (particularly retained on the downstream side of the check valve 180) from the air exhausting hole 142. The disclosure is not limited thereto and may be adjusted according to requirements.

In summary, in the air exhausting method of the vehicle brake system of the disclosure, for the vehicle brake system that uses the switching valve to switch the communication state of the master cylinder and the slave cylinder connected to the wheel cylinder as the fluid pressure supply source and uses the bypass passage and the check valve connected from the reservoir installed on the master cylinder or the slave cylinder to the part of the passage closer to the downstream side than the switching valve and closer to the upstream side than the brake fluid pressure control device, the slave cylinder is actuated on the pressurization side and the depressurization side in sequence, and the air exhausting hole of the wheel cylinder is opened and closed, so that air retained in the bypass passage moves from the bypass passage to the passage section and is exhausted from the air exhausting hole. Preferably, the switching valve is the three-way valve connecting the master cylinder, the slave cylinder, and the wheel cylinder. Thus, in the disclosure, the external air exhausting device does not need to be used, and air can be exhausted via a simple operation such as an operation of the slave cylinder and/or an opening/closing operation of the air exhausting hole, thereby saving additional costs and operation procedures. Accordingly, the air exhausting method of the vehicle brake system of the disclosure can exhaust air more efficiently in the vehicle brake system which uses the switching valve to shorten the passage and miniaturize the system, and uses the bypass passage and the check valve to ensure the flow of the brake fluid.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An air exhausting method of a vehicle brake system, used to exhaust air from the vehicle brake system, wherein the vehicle brake system comprises a master cylinder, a slave cylinder, a passage, a wheel cylinder, a switching valve, a brake fluid pressure control device, a bypass passage, and a check valve, the master cylinder generates brake fluid pressure through operating a brake operator, the slave cylinder generates brake fluid pressure by using a driving force of an actuator based on an electrical signal, the passage connects the master cylinder and the slave cylinder to the wheel cylinder, the switching valve switches a communication state of the master cylinder and the slave cylinder, the brake fluid pressure control device is disposed in the passage closer to a downstream side than the switching valve and controls the brake fluid pressure transmitted to the wheel cylinder, the bypass passage is connected from a reservoir installed on the master cylinder or the slave cylinder to a part of the passage closer to the downstream side than the switching valve and closer to an upstream side than the brake fluid pressure control device, the check valve is disposed in the bypass passage, when the brake fluid pressure control device performs pressurization control on a brake fluid, the check valve allows the brake fluid to flow from a side close to the reservoir toward a side close to the brake fluid pressure control device and blocks the brake fluid from flowing from the side close to the brake fluid pressure control device toward the side close to the reservoir, and the wheel cylinder has a switchable air exhausting hole, the air exhausting method of the vehicle brake system comprising:
    a first step of actuating the slave cylinder on a pressurization side in a state where the switching valve communicates the slave cylinder with the brake fluid pressure control device, so that air retained in a passage section from the slave cylinder to the brake fluid pressure control device is exhausted from the air exhausting hole;
    a second step of actuating the slave cylinder on a depressurization side after the first step in a state where the air exhausting hole is closed, so that air retained in the bypass passage moves toward the passage section; and
    performing the first step again after the second step, so that air moved from the bypass passage to the passage section is exhausted from the air exhausting hole.

* * * * *